United States Patent
Kudo

(10) Patent No.: US 8,442,201 B2
(45) Date of Patent: May 14, 2013

(54) TELEPHONE DEVICE

(75) Inventor: Yasuhiro Kudo, Ichinomiya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 1016 days.

(21) Appl. No.: 12/397,810

(22) Filed: Mar. 4, 2009

(65) Prior Publication Data

US 2009/0225976 A1 Sep. 10, 2009

(30) Foreign Application Priority Data

Mar. 5, 2008 (JP) ................................. 2008-055186

(51) Int. Cl.
H04M 3/42 (2006.01)

(52) U.S. Cl.
USPC ............. 379/207.05; 379/208.01; 379/215.01

(58) Field of Classification Search ............. 379/207.05, 379/207.06, 207.07, 208.01, 209.01, 215.01
See application file for complete search history.

(56) References Cited

U.S. PATENT DOCUMENTS

| | | | | |
|---|---|---|---|---|
| 5,381,415 | A * | 1/1995 | Mizutani | ........................ 379/350 |
| 6,035,220 | A | 3/2000 | Claudio | |
| 6,157,708 | A | 12/2000 | Gordon | |
| 6,314,173 | B1 | 11/2001 | Hatamura | |
| 2004/0005042 | A1 | 1/2004 | Dhara | |
| 2007/0121831 | A1 * | 5/2007 | Kim et al. | .................. 379/93.31 |
| 2007/0189475 | A1 | 8/2007 | Pearson | |
| 2008/0279358 | A1 * | 11/2008 | Kim et al. | ................. 379/208.01 |

FOREIGN PATENT DOCUMENTS

| | | |
|---|---|---|
| EP | 0999683 | 5/2000 |
| JP | 4-154331 | 5/1992 |
| JP | 10-200651 | 7/1998 |
| JP | 2001-24813 | 1/2001 |
| JP | 2003-18650 | 1/2003 |
| JP | 2007-116420 | 5/2007 |
| WO | WO 99/51044 | 10/1999 |
| WO | WO03073714 | 9/2003 |

OTHER PUBLICATIONS

English Abstract of WO03073714, published Sep. 4, 2003, "Network Telephone System," serving as the Concise Statement of the relevance of WO03073714.

English Abstract of JP 2001-24813, published Jan. 26, 2001, "Communication Equipment and Method for Controlling Its Communication," serving as the Concise Statement of the relevance of JP 2001-24813.

(Continued)

*Primary Examiner* — Ahmad Matar
*Assistant Examiner* — Nafiz E Hoque
(74) *Attorney, Agent, or Firm* — Vierra Magen Marcus LLP

(57) ABSTRACT

A telephone device comprises an operating device, a call request receiving device, a first identification information determination device and a first positive response sending device. The call request receiving device may be configured to receive a call request. The first identification information determination device may be configured to determine, on a condition that the call request is received by the call request receiving device in a time between a call preparing operation being started and the call preparing operation being ended on the operating device, whether or not telephone identification information corresponding to the call preparing operation is identical to telephone identification information of the source of the call request. The first positive response sending device may be configured to send the positive response in reply to the call request on a condition that a positive determination is obtained by the first identification information determination device.

7 Claims, 11 Drawing Sheets

OTHER PUBLICATIONS

English Abstract of JP 2003-18650, published Jan. 17, 2003, "Wireless Communication System," serving as the Concise Statement of the relevance of JP 2003-18650.

Japanese Office Action dated Jun. 11, 2010, Japanese Patent Appl. 2008-055186.

Rosenberg, et al., "RFC 3261: SIP: Session Initiation Protocol," IETF Request for Comments, Jun. 1, 2002, pp. 1-269.

European Search Report dated Jun. 10, 2009, European Patent Appl. No. 09250639.3.

* cited by examiner

FIG. 10

```
                                    ,183 Session Progress 616
                                   /
                                 ∠

SIP/2.0 183 Session Progress  ←―――――700
  From: <sip:ua1@example.co.jp> ←――――702
  To: <sip:ua2@example.co.jp>   ←――――704
  Call-ID: 5836a3b8@192.168.0.1 ←――――706
  Cseq: 1 INVITE                ←――――708
  Content-Type: application/sdp
  Content-Length: 113
  X-Compare-ID: 3f98be3@192.168.0.2 ←――710
                ‾‾‾‾‾‾‾
                   R1 v=0
  o=- 1 1 IN IP4 192.168.0.2
  s=-
712 { c=IN IP4 192.168.0.2
  t=0 0
  m=audio 5004 RTP/AVP 0
  a=rtpmap:0 PCMU/8000
```

TELEPHONE DEVICE

CROSS-REFERENCE TO RELATED APPLICATION

This application claims priority to Japanese Patent Application No. 2008-055186, filed on Mar. 5, 2008, the contents of which are hereby incorporated by reference into the present application.

BACKGROUND

1. Field

The present invention relates to a telephone device.

2. Description of the Related Art

EP0999683A2 discloses a telephone device that is configured to perform telephone communications via a public telephone network. Further, International Publication No. WO 03/073714 discloses a telephone device that is configured to perform telephone communications via an IP telephone network.

SUMMARY

A situation may arise in which telephone calls are mutually placed simultaneously between two telephone devices. In this situation, the telephone calls may not be connected. This specification provides a technique that makes it possible for telephone devices to connect a call even in a case where telephone calls are mutually placed simultaneously between two telephone devices.

A telephone device disclosed in this specification may be configured to send a positive response in reply to a call request in order to construct a call established status with a source of the call request. This telephone device may perform telephone communications via a public telephone network (PSTN (Public Switched Telephone Network) or ISDN (Integrated Services Digital Network)), and, alternately, it may perform telephone communications via an IP telephone network. That is, the telephone device may be an ordinary telephone device or an IP telephone device. Further, as another alternative, the telephone device may perform telephone communications selectively via the public telephone network and the IP telephone network.

The above-mentioned telephone device may comprise an operating device, a call request receiving device, a first identification information determination device and a first positive response sending device. The operation device may be configured to allow a user to operate. The call request receiving device is configured to receive a call request. The first identification information determination device may be configured to determine whether or not telephone identification information corresponding to a call preparing operation is identical to the telephone identification information of the source of the call request. This determination may be made on a condition that the call request is received by the call request receiving device in a time between the call preparing operation being started and that call preparing operation being ended on the operating device (hereinafter, aforesaid duration of time may be called the "first predetermined time period"). The first positive response sending device may be configured to send a positive response in reply to the call request on a condition that a positive determination is obtained by the first identification information determination device.

The above-mentioned "start" of the call preparing operation may signify the time at which the telephone device transitions from the on-hook state to the off-hook state. Lifting a handset and operating the hook key can be cited as an example of the "start" of the call preparing operation. Furthermore, in the case of a telephone device having a function that automatically goes off-hook where the user starts inputting of the telephone identification information, the "start" of a call preparing operation may also include starting the input of telephone identification information. Most telephone devices are configured to allow the input of telephone identification information subsequent to the start of the call preparing operation. This type of telephone device shifts to a process for sending a call request once a predetermined time period has elapsed after the final operation for inputting telephone identification information has been carried out. The above-mentioned "end" of the call preparing operation may signify the time at which the predetermined time period elapsed after the above-mentioned final operation had been performed. Alternatively, in the case of a telephone device that allows the user to operate to carry out a predetermined operation (for example, operation of a sharp key) denoting the end of the input of telephone identification information, the "end" of the call preparing operation may also include the time at which the above-mentioned predetermined operation was performed. Further, the terminology "input of telephone identification information" mentioned above is a concept that should be interpreted in its broadest sense, and may comprise all sorts of procedures for inputting telephone identification information. For example, "inputting telephone identification information" may include inputting telephone identification information by operating numeric keys or alphabet keys, inputting telephone identification information by operating a so-called speed dial operation, and inputting telephone identification information by selecting one piece of telephone identification information from among a plurality of pieces of telephone identification information stored beforehand (in a so-called telephone directory). Further, the description stating that "the first identification information determination device determines . . . on a condition that the call request is received by this call request receiving device during a first predetermined time period" mentioned hereinabove does not exclude the above-mentioned determination being made in a case where a call request is received in a time period other than the above-mentioned first predetermined time period.

In the above-mentioned telephone device, in a case where a call request is received after the call preparing operation has been performed and the telephone device has transitioned to the off-hook state, a determination is made as to whether or not the telephone identification information corresponding to the telephone preparing operation is identical to the telephone identification information of the source of the call request. In a case where the aforementioned two telephone identification information are identical, the telephone device sends a positive response in reply to the call request. As a result of this, call established status is constructed with the source of the call request (that is, the call between the telephone devices is connected). According to the above-described telephone device, even in a case where a situation in which a call request is received from a telephone device corresponding to telephone identification information while the user is inputting the same telephone identification information in the off-hook state (hereinafter, may be called the "first case") arises, the telephone devices are able to be connected in accordance with this call request.

In this specification, a telephone device that is capable of coping with a case where a call request is received from the destination of a self-sent call request prior to receiving a response in reply to this self-sent call request may be provided. This telephone device may be capable of coping with the first case or may not. The telephone device may be configured to send a positive response in reply to a call request in order to construct a call established status with a source of the call request. The telephone device may comprise an operating device, a call request sending device, a response receiving device, a call request receiving device, an identification information determination device and a positive response sending device. The operating device may be configured to allow a user to operate. The call request sending device may be configured to send, on a condition that a call preparing operation is ended on the operating device, a call request to telephone identification information corresponding to the call preparing operation as a destination. The response receiving device may be configured to receive a response in reply to the call request sent by the call request sending device. The call request receiving device may be configured to receive a call request. The identification information determination device may be configured to determine, on a condition that a second call request is received by the call request receiving device in the time between a first call request being sent by the call request sending device and a response in reply to the first call request being received by the response receiving device, whether or not telephone identification information of the destination of the first call request is identical to telephone identification information of the source of the second call request. The positive response sending device may be configured to send a positive response in reply to the second call request on a condition that a positive determination is obtained by the identification information determination device.

BRIEF DESCRIPTION OF THE DRAWINGS

FIG. 10 shows an example of the data contents of a 183 Session Progress; and

DETAILED DESCRIPTION

Figure 1:
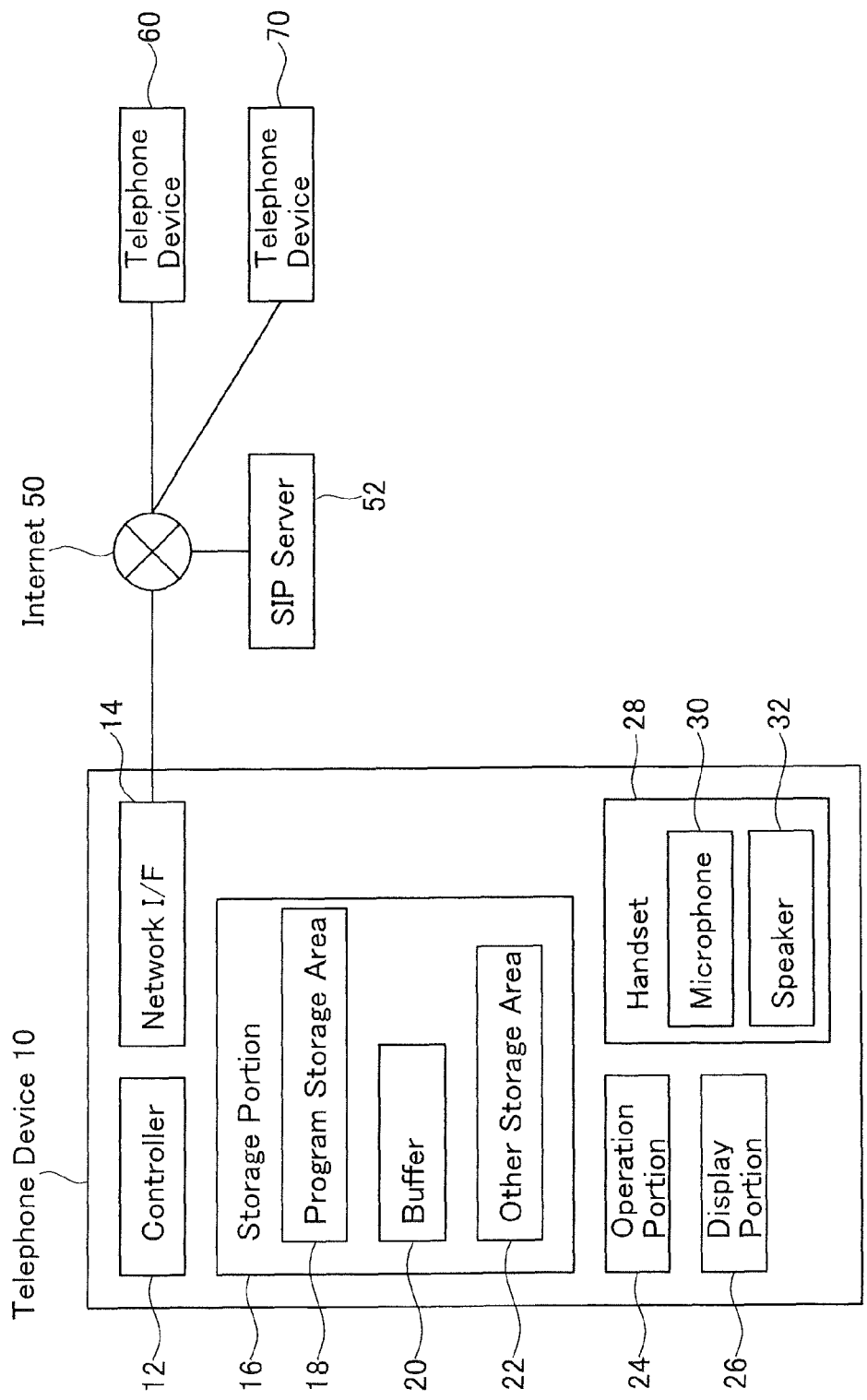
FIG. 1 shows an example of a telephone network system.

The embodiment will be explained by referring to the drawings. FIG. 1 shows a telephone network system 2 of this embodiment. The telephone network system 2 comprises a plurality of telephone devices 10, 60, 70, the Internet (IP network) 50 and an SIP server 52. Each of the telephone devices 10, 60, 70 is respectively connected to the Internet 50.

Each of the telephone devices 10, 60, 70 is configured to perform telephone communications via the Internet 50. That is, each of the telephone devices 10, 60, 70 is an IP telephone device. Unique SIP-URI is assigned to each of the telephone devices 10, 60, 70. The SIP server 52 stores the SIP-URI of the respective telephone devices 10, 60, 70. The SIP server 52 is connected to the Internet 50. The SIP server 52 uses the SIP to control telephone communications between the respective telephone devices 10, 60, 70.

Telephone Device Configuration

The configuration of telephone device 10 will be explained. Telephone devices 60, 70 have the same configuration as that of telephone device 10. Therefore, detailed explanations of telephone devices 60, 70 will be omitted. In this embodiment, the explanation will regard the respective telephone devices 10, 60, 70 as a fixed-line telephone device. However, the respective telephone devices 10, 60, 70 may alternatively be cordless-type telephone device or mobile telephone device.

Telephone device 10 comprises a controller 12, a network interface 14, a storage portion 16, an operation portion 24, a display portion 26 and a handset 28. The controller 12 executes a variety of process in accordance with a program stored in the storage portion 16. The contents of the processes executed by the controller 12 will be explained in detail below. The network interface 14 is connected to the Internet 50. The telephone device 10 can access the Internet 50 via the network interface 14.

The storage portion 16 is configured from ROM, EEPROM, and RAM. The storage portion 16 comprises a program storage area 18; a buffer 20; and another storage area 22. The program storage area 18 stores a program to be executed by the controller 12. The buffer 20 can temporarily store various information generated in the course of the controller 12 executing processes. The other storage area 22 can store information other than the information that is to be stored in the program storage area 18 and the buffer 20.

The operation portion 24 comprises a plurality of keys. The operation portion 24 comprises a ten-key pad and a hook key. The user can input a variety of information into the telephone device 10 by operating the operation portion 24. The handset 28, which will be explained below, depresses the hook key (that is, it is in the on-hook state) when the handset 28 is not in use. The user can set the hook key to the off-hook state by picking up the handset 28. The user sets the hook key to the off-hook state when placing a telephone call from this telephone device 10. Next, the user inputs telephone identification information into the telephone device 10 by operating the ten-key pad (or by carrying out a speed dial operation). Consequently, the user is able to place a telephone call. Hereinafter, setting the hook key to the off-hook state and inputting telephone identification information will be called a "call preparing operation". Further, the user can set the hook key to the off-hook state when there is an incoming telephone call. Consequently, the user is able to take a telephone call. Hereinafter, setting the hook key to the off-hook state for an incoming telephone call will be called a "call start operation".

The display portion 26 can display a variety of information. For example, the display portion 26 can display a telephone identification information list (omitted from the drawings) that is stored in the storage portion 16. The user can select one piece of telephone identification information from the telephone identification information list displayed on the display portion 26. Consequently, the user can input the telephone identification information into the telephone device 10. The handset 28 comprises a microphone 30 and a speaker 32.

Example of Telephone Communications Using SIP Server

Figure 2:
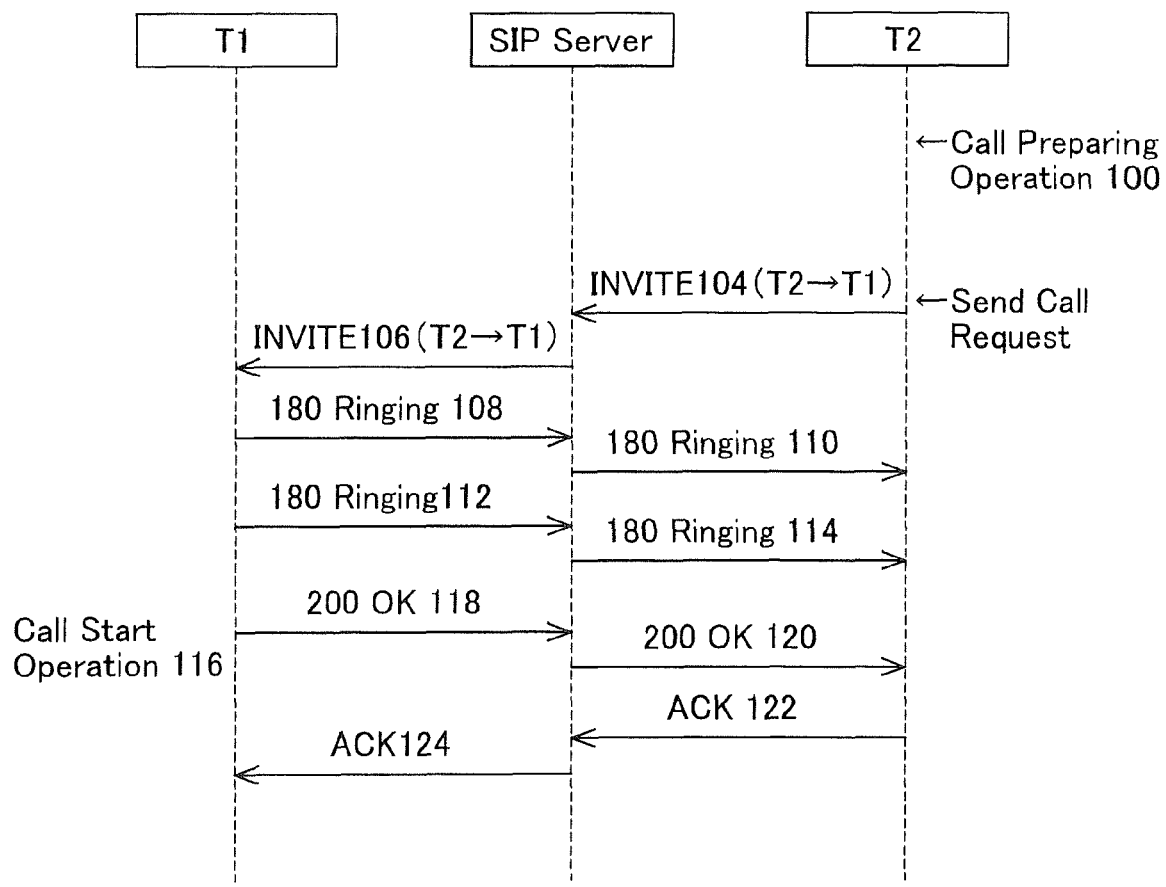
FIG. 2 shows a sequence diagram of an example of telephone communications performed by a telephone device in the embodiment.

Next, an example of telephone communications using the SIP server 52 will be explained. FIG. 2 shows a sequence diagram of an example of a telephone communication. Reference numerals T1 and T2 of FIG. 2 both denote telephone devices. Furthermore, hereinafter, it is supposed that telephone devices having the reference letter T (T1, T2) have the functions of the telephone device 10 of this embodiment. On the other hand, it is supposed that telephone devices having the reference letter P (P1, P2), which are used in FIG. 3 and so forth explained hereinbelow, have the functions of the conventional IP telephone device, and does not have the functions of the telephone device 10 of this embodiment. The IP telephone devices are configured to perform telephone communications via an IP network.

The user of telephone device T2 can carry out a call preparing operation 100. In a case where a predetermined time period has elapsed subsequent to telephone identification information (i.e. a SIP-URI) having been inputted in the call preparing operation 100, the telephone device T2 executes a process for sending a call request. Furthermore, the user can carry out an operation (for example, a sharp key operation) for sending the call request subsequent to inputting the telephone identification information. In this case, the telephone device T2 executes the process for sending the call request without waiting for the above-mentioned predetermined time period to elapse. Specifically, the telephone device T2 sends an INVITE 104 to the SIP server 52. The INVITE 104 includes information denoting the source thereof (i.e. the telephone identification information of the telephone device T2) and information denoting the destination thereof (i.e. the telephone identification information of the telephone device T1). The SIP server 52, upon receiving the INVITE 104, transfers an INVITE 106 to the telephone device T1.

The telephone device T1 receives the INVITE 106. Upon receiving the INVITE 106, the telephone device T1 executes a call request notice. There are no particular limitations on the format of the call request notice executed by the telephone device T1. For example, the telephone device T1 may output a ringing sound, may vibrate, or may carry out a predetermined display. The telephone device T1, upon receiving the INVITE 106, sends a 180 Ringing 108 to the SIP server 52 as the response in reply to the INVITE 106. The SIP server 52, upon receiving the 180 Ringing 108, transfers a 180 Ringing 110 to the telephone device T2. The telephone device T2, upon receiving the 180 Ringing 110, outputs a ringing sound from the speaker of the handset. Consequently, the user of the telephone device T2 comes to know that a call request notice is being executed for the telephone device T1 (i.e. the telephone device Ti is being invoked). The telephone device T1 repeats the sending of the 180 Ringing to the SIP server 52 at predetermined intervals. In the example of FIG. 2, a second 180 Ringing 112 is sent to the SIP server 52. The SIP server 52, upon receiving the 180 Ringing 112, transfers a 180 Ringing 114 to the telephone device T2.

Furthermore, in a case where a description in this embodiment states "sends Y as the response in reply to X", this signifies that Y includes information specifying that Y is the response in reply to X, information regarding the source of Y (which also had been the destination of X), and information regarding the destination of Y (which also had been the source of X). For example, in a case where there is a description stating "sends the 180 Ringing 108 as the response in reply to the INVITE 106", the 180 Ringing 108 includes information specifying that the 180 Ringing 108 is the response in reply to the INVITE 106, the telephone identification information of the telephone device T1, which is the source of the 180 Ringing 108, and the telephone identification information of the telephone device T2, which is the destination of the 180 Ringing 108.

The user of the telephone device T1 can perform a call start operation. In this case, the telephone device T1 sends a 200 OK 118 to the SIP server 52 as the response in reply to the INVITE 106. The SIP server 52, upon receiving the 200 OK 118, transfers the 200 OK 120 to the telephone device T2. The telephone device T2, upon receiving the 200 OK 120, sends an ACK 122 to the SIP server 52. The SIP server 52, upon receiving the ACK 122, transfers an ACK 124 to the telephone device T1. Consequently, an RTP (Real-time Transport Protocol) communication session is established between the telephone device T1 and the telephone device T2. The call established status is thereby constructed between telephone device T1 and telephone device T2.

Example of Telephone Communication Using conventional IP Telephone Device

Figure 3:
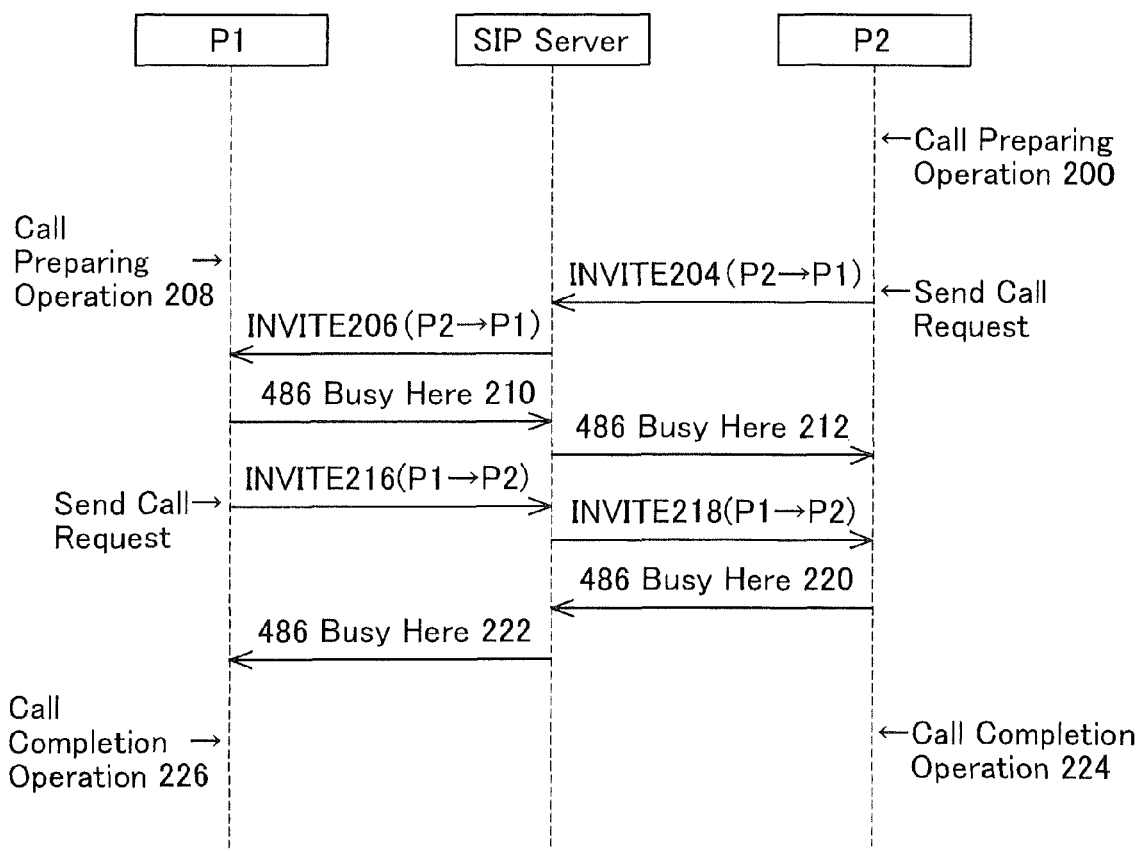
FIG. 3 shows a sequence diagram of an example of telephone communications performed by a conventional telephone device.

FIG. 3 shows a sequence diagram of an example of telephone communications performed between conventional IP telephone devices P1, P2. The user of the telephone device P2 can carry out a call preparing operation 200. As the consequence, the telephone device P2 executes a process for sending a call request. That is, the telephone device P2 sends an INVITE 204 to the SIP server 52. The SIP server 52, upon receiving the INVITE 204, transfers an INVITE 206 to the telephone device P1.

The user of the telephone device P1 can perform a call preparing operation 208. That is, the user of the telephone device P1 can set the hook key to the off-hook state. Upon receiving the INVITE 206 in this state, the telephone device P1 sends a 486 Busy Here 210 to the SIP server 52 as the response in reply to the INVITE 206. The SIP server 52, upon receiving the 486 Busy Here 210, transfers a 486 Busy Here 212 to the telephone device P2. Consequently, the telephone device P2 outputs a sound denoting the line busy from the speaker of the handset. The user of the telephone device P2 comes to know that the telephone device P1 is busy. As a result of this, the user of the telephone device P2 carries out a call completion operation 224.

In the example of FIG. 3, the user of the telephone device P1 attempts to place a telephone call to the telephone device P2 by carrying out the call preparing operation 208. The telephone device P1 accordingly executes a process for sending a call request. That is, the telephone device P1 sends an INVITE 216 to the SIP server 52. The SIP server 52, upon receiving the INVITE 216, transfers an INVITE 218 to the telephone device P2. The telephone device P2 remains in the off-hook state until the call completion operation 224 is carried out. Upon receiving the INVITE 218 in this state, the telephone device P2 sends a 486 Busy Here 220 to the SIP server 52 as the response in reply to the INVITE 218. The SIP server 52, upon receiving the 486 Busy Here 220, transfers the 486 Busy Here 222 to the telephone device P1. Consequently, the telephone device P1 outputs a sound denoting busy from the speaker of the handset. The user of the telephone device P1 comes to know that the telephone device P2 is busy. As a result of this, the user of telephone device P1 performs a call completion operation 226.

As described above, in the example of FIG. 3, the call preparing operation 200 for placing a telephone call from the telephone device P2 to the telephone device P1 is performed at the same time as a call preparing operation 208 for placing a telephone call from the telephone device P1 to the telephone device P2. In the conventional telephone devices P1, P2, it is not possible to establish telephone communications in a case like this (hereinafter, called the "first case"). The telephone device 10 of this embodiment can perform telephone communications even where the above-mentioned first case occurs. The specific procedures for this will be explained by referring to FIG. 4.

Example of Telephone Communications Coping with the First Case

Figure 4:
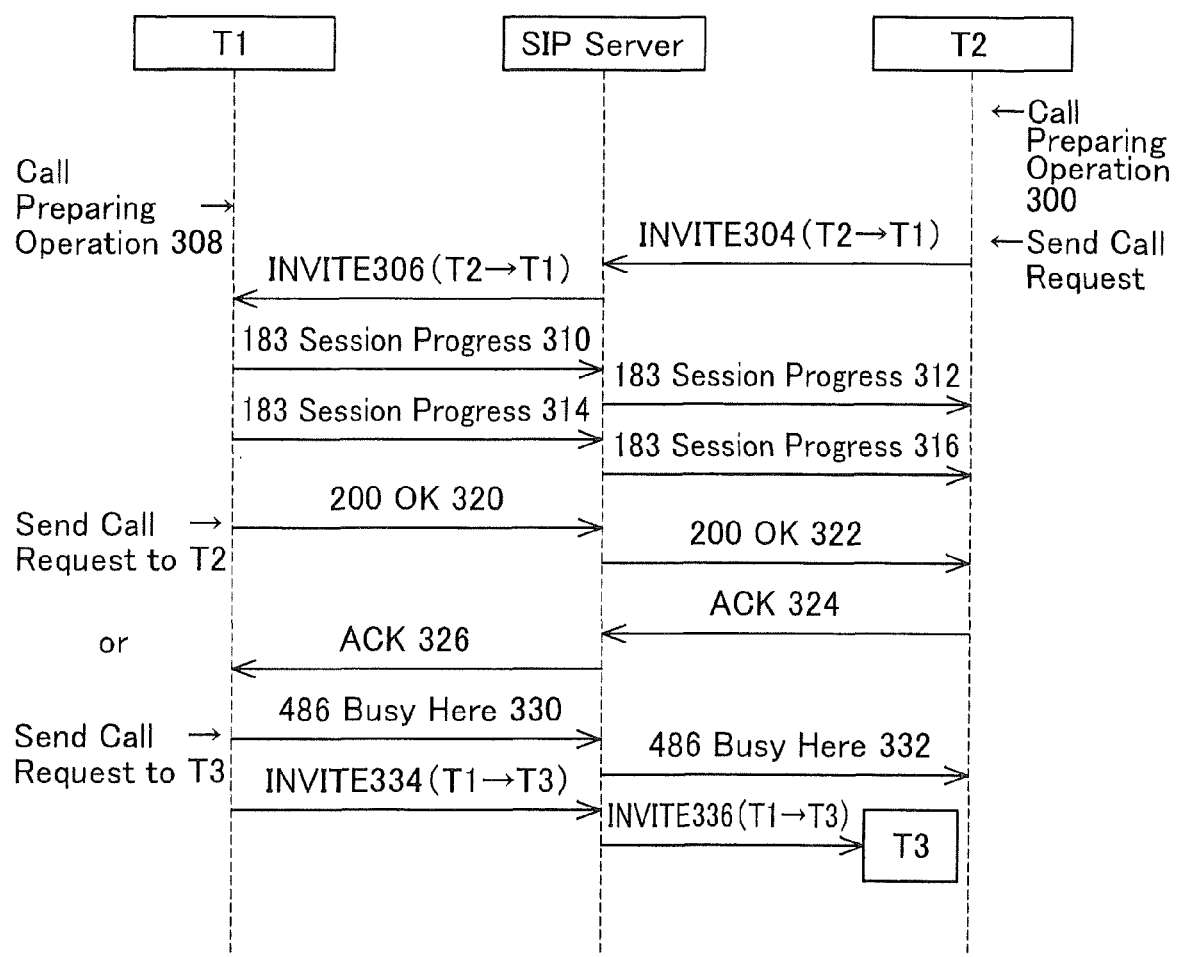
FIG. 4 shows a sequence diagram of an example of telephone communications performed by a telephone device in the embodiment.

FIG. 4 shows a sequence diagram of an example of telephone communications coping with the above-mentioned first case. The user of the telephone device T2 can perform a call preparing operation 300. The telephone device T2 accordingly executes a process for sending a call request. That is, the telephone device T2 sends an INVITE 304 to the SIP server 52. The SIP server 52, upon receiving the INVITE 304, transfers an INVITE 306 to the telephone device T1.

The user of the telephone device T1 can perform a call preparing operation 308. That is, the user of the telephone device T1 can set the hook key to the off-hook state. Upon receiving the INVITE 306 in this state, the telephone device T1 sends a 183 Session Progress 310 to the SIP server 52 as the response in reply to the INVITE 306. The SIP server 52, upon receiving the 183 Session Progress 310, transfers a 183 Session Progress 312 to the telephone device T2. The 183 Session Progress is a response message that is defined by the SIP. The IP telephone device using the SIP, upon receiving the 183 Session Progress, waits until another response (e.g. a 200 OK, or a 486 Busy Here) has been received. That is, the 183 Session Progress may be termed as a response for instructing a wait. The telephone device T2, upon receiving the 183 Session Progress 312, waits to receive another response. The telephone device T1 repeats to send the 183 Session Progress to the SIP server 52 at predetermined intervals. In the example of FIG. 4, the telephone device T1 sends a second 183 Session Progress 314 to the SIP server 52. The SIP server 52, upon receiving the 183 Session Progress 314, transfers a 183 Session Progress 316 to the telephone device T2.

In the example shown in FIG. 4, the user of the telephone device T1 attempts to place a telephone call to telephone device T2 by performing a call preparing operation 308. In this case, the telephone device TI sends a 200 OK 320 to the SIP server 52 as the response in reply to the INVITE 306. The SIP server 52, upon receiving the 200 OK 320, transfers a 200 OK 322 to the telephone device T2. The telephone device T2, upon receiving the 200 OK 322, sends an ACK 324 to the SIP server 52. The SIP server 52, upon receiving the ACK 324, transfers the ACK 326 to the telephone device T1. Consequently, an RTP communication session is established between the telephone device T1 and the telephone device T2. Call established status is thereby constructed between the telephone device T1 and the telephone device T2. Furthermore, a process for sending an INVITE to the telephone device T2 in accordance with the call preparing operation 308 is not executed.

On the other hand, in the other example shown in FIG. 4, the user of the telephone device T1 attempts to place a telephone call to the telephone device T3 by operating a call preparing operation 308. In this case, the telephone device T1 sends a 486 Busy Here 330 to the SIP server 52 as the response in reply to the INVITE 306 from the telephone device T2. The SIP server 52, upon receiving the 486 Busy Here 330, transfers a 486 Busy Here 332 to the telephone device T2. Next, the telephone device T1 sends an INVITE 334 to the SIP server 52. The INVITE 334 includes the telephone identification information of the telephone device T1 as the source thereof, and the telephone identification information of the telephone device T3 as the destination thereof. The SIP server 52, upon receiving the INVITE 334, transfers an INVITE 336 to the telephone device T3.

Controller-Executed Processing

Figure 5:
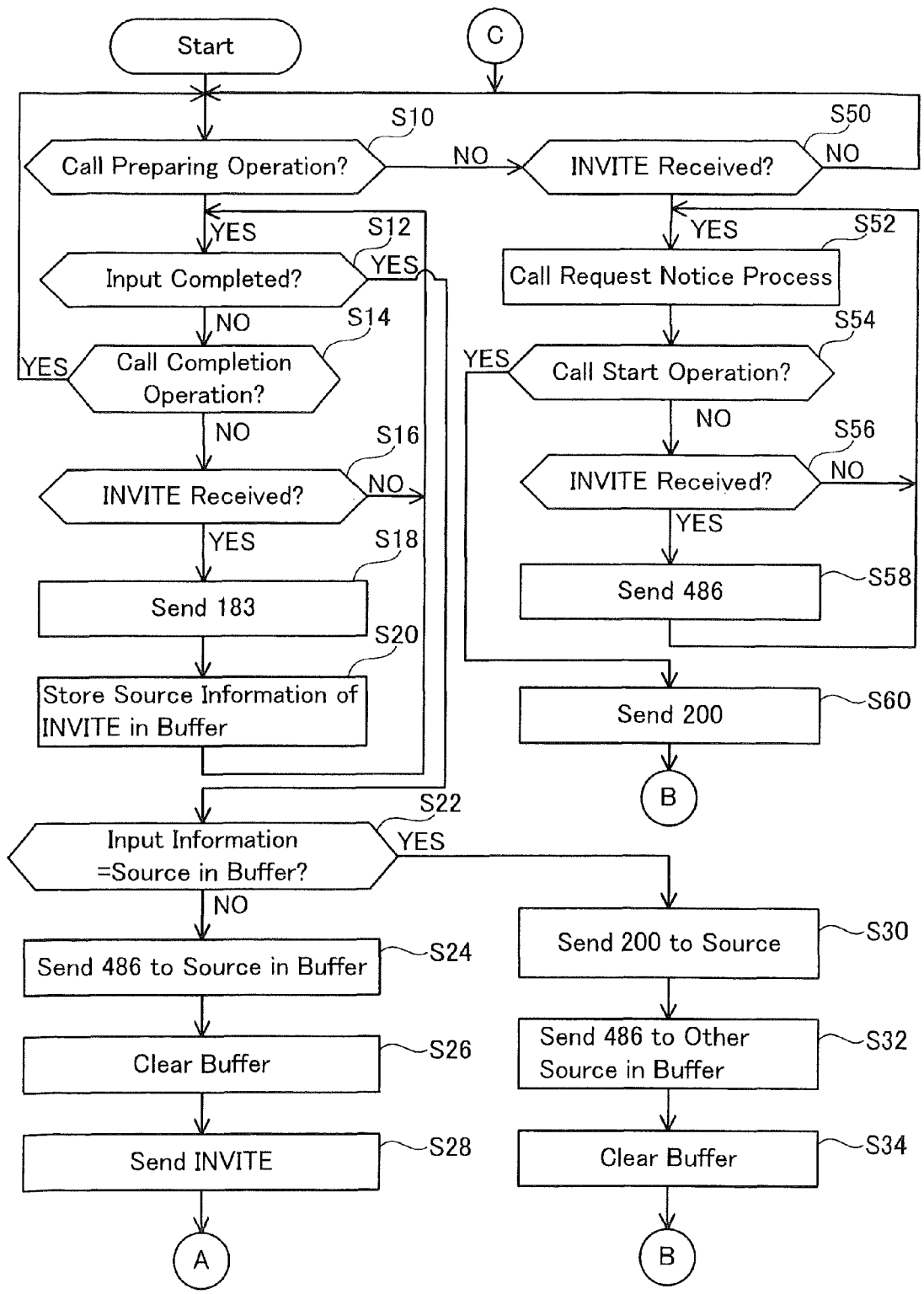
FIG. 5 shows a flowchart of processing executed by the controller.
Figure 6:
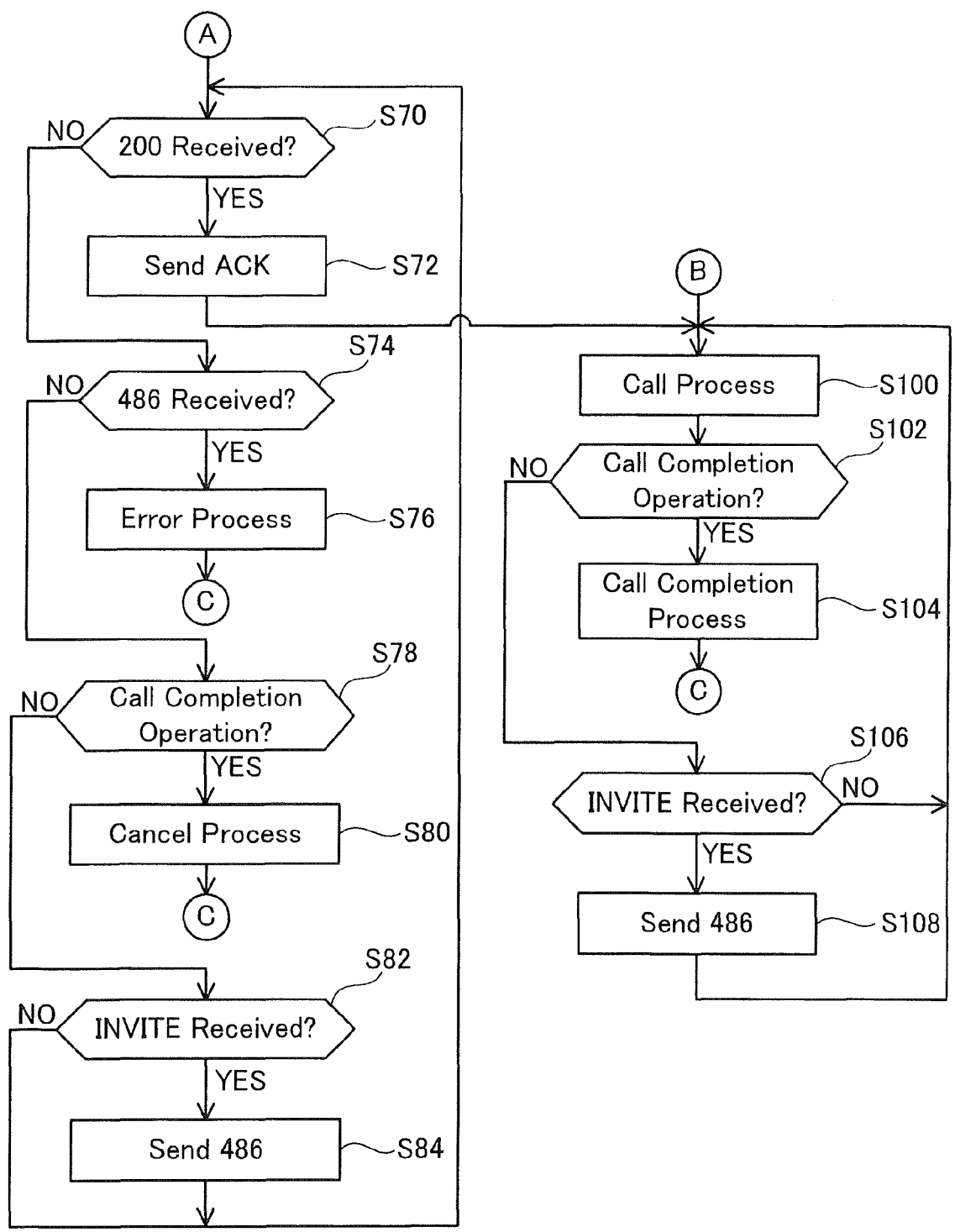
FIG. 6 shows a continuation of the flowchart of FIG. 5.

Next, the contents of process executed by the telephone device 10 for performing telephone communications that complies with the above-mentioned first case will be explained. The following process is executed by the controller 12 of the telephone device 10. FIGS. 5 and 6 show flowcharts of the process executed by the controller 12. The controller 12 monitors for the call preparing operation (S10). Meanwhile, the user, for example, can set the hook key to the off-hook state by picking up the handset 28. In this case, a determination of YES is obtained in S10. Next, the controller 12 determines whether or not the input of the telephone identification information has been completed (S12). A determination of YES is obtained in S12 either in a case where a predetermined time period has elapsed since the final input (including the selection of speed dial) or the sharp key has been operated.

In a case where the determination in S12 is NO, the controller 12 determines whether or not a call completion operation has been carried out (S14). For example, the user can set the hook key to the on-hook state by putting down the handset 28. In this case, a determination of YES is obtained in S14, and the process returns to S10. In a case where the determination in S14 is NO, the controller 12 determines whether or not an INVITE has been received (S16). In a case where the determination in S16 is NO, the process returns to S12. On the other hand, in a case where the determination in S16 is YES, the controller 12 sends a 183 Session Progress to the SIP server 52 as the response in reply to the INVITE (S18). This process S18 is equivalent to the process of reference numeral 310 of FIG. 4. Next, the controller 12 stores the telephone identification information of the source of the INVITE received in S16 in the buffer 20 (S20). In a case where S20 ends, the process returns to S12.

In a case where the determinations obtained in S12 and S14 in a second round of the aforesaid processes are NO, the controller 12 once again determines whether or not an INVITE has been received (S16). In a case where an INVITE that differs from the INVITE received in the previous S16 has been received, the controller 12 sends a 183 Session Progress to the SIP server 52 as the response in reply to the above-mentioned different INVITE (S18). The controller 12 stores the telephone identification information of the source of the above-mentioned different INVITE in the buffer 20 (S20). In this case, a plurality of telephone identification information is stored in the buffer 20. Furthermore, although not shown in the flowchart, the controller 12 periodically sends a 183 Session Progress during the loop of S12 through S20. Consequently, the 183 Session Progress is sent to the source of the INVITE a plurality of times as shown in reference numeral 314 of FIG. 4.

In a case where the input of the telephone identification information is completed, a determination of YES is obtained in S12. In this case, the controller 12 determines whether or not the inputted telephone identification information is identical to the telephone identification information stored in the buffer 20 (S22). In a case where a determination of NO is obtained in S22, processing proceeds to S24. On the other hand, in a case where a determination of YES is obtained in S22, processing moves to S30. Furthermore, in a case where no telephone identification information is stored in the buffer 20, the controller 12 determines NO in S22. In this case, S24 and S26, which will be explained below, are skipped.

In S24, the controller 12 sends a 486 Busy Here to the source as stored in the buffer 20. That is, the controller 12 sends the 486 Busy Here as the response in reply to the INVITE that had been received in S16. This process is equivalent to the processing of reference numeral 330 of FIG. 4. Next, the controller 12 clears the buffer 20 (S26). Next, the controller 12 sends an INVITE to the telephone identification information inputted in S12 as the destination thereof (S28). This INVITE is sent to the destination via the SIP server 52. In a case where S28 ends, the process proceeds to S70 of FIG. 6.

In S70, the controller 12 monitors to receive a 200 OK in response to the INVITE having been sent in S28. In a case where the determination in S 70 is YES, the controller 12 sends an ACK to the source of the 200 OK (S72). This ACK is sent to the source of the 200 OK via the SIP server 52. Consequently, a communication session (RTP session) is established between the telephone device 10 and the destination of the INVITE sent in S28. Next, the controller 12 executes a call process (S100). Specifically, the controller 12 executes a process for sending voice data picked up by the microphone 30 of the handset 28 and a process for outputting from the speaker 32 the voice data received via the network interface 14. Consequently, the users are able to put a call through.

The controller 12 monitors for a call completion operation (S102). Meanwhile, the user can set the hook key to the on-hook state by putting down the handset 28. In this case, a determination of YES is obtained in S102. Further, a YES determination is obtained in S102 even where a BYE command is received by the network interface 14 (that is, when the calling partner disconnects the telephone first). In a case where the determination obtained in S102 is YES, the controller 12 executes a call completion process (S104). For example, in a case where the hook key is in the on-hook state, the controller 12 sends a BYE. A 200 OK is received as the response in reply to the BYE. Consequently, the RTP session is disconnected. On the other hand, for example, in a case where a BYE is received, the controller 12 sends a 200 OK as the response in reply to the BYE. Consequently, the RTP session is disconnected. When S104 ends, processing returns to S10.

In a case where the determination in S102 is NO, the controller 12 determines whether or not an INVITE has been received (S106). In a case where the determination in S106 is YES, the controller 12 sends a 486 Busy Here as the response in reply to the INVITE received in S106 (S108). In a case where S108 ends, the process returns to S100.

On the other hand, in a case where the determination in S70 is NO, the controller 12 determines whether or not a 486 Busy Here has been received (S74). In a case where the determination in S74 is YES, the controller 12 executes an error process (S76). Specifically, the controller 12 outputs the sound denoting busy from the speaker 32. Consequently, the user comes to know that the destination of the INVITE that had been sent in S28 is busy. In a case where S76 ends, processing returns to S10.

In a case where the determination in S74 is NO, the controller 12 determines whether or not a call completion operation has been carried out (S78). The user can set the hook key to the on-hook state by putting down the handset 28. In this case, a determination of YES is obtained in S78, and the process proceeds to S80. In S80, the controller 12 accordingly executes a cancel process. Specifically, the controller 12 sends a command denoting end of communication to the destination of the INVITE sent in S28. In a case where S80 ends, processing returns to S10.

In a case where the determination in S78 is NO, the controller 12 determines whether or not an INVITE has been received (S82). In a case where the determination in S82 is YES, the controller 12 sends a 486 Busy Here as the response in reply to the INVITE received in S82 (S84). In a case where S84 ends, or in a case where the determination in S82 is NO, processing returns to S70.

Next, the contents of the process executed in a case where a determination of YES is made in S22 of FIG. 5 will be explained. In a case where the telephone identification information inputted in S12 is identical to the telephone identification information stored in the buffer 20 (YES in S22), the controller 12 proceeds to S30. In S30, the controller 12 sends a 200 OK to the destination being the matching telephone identification information. That is, the controller 12 sends the 200 OK as the response in reply to the INVITE received in S16. This process is equivalent to the processing of reference numeral 320 of FIG. 4. As a result of this, an ACK is sent from the destination of the 200 OK, and an RTP session is thereby established. Furthermore, the controller 12 sends a 486 Busy Here to the destination being the other telephone identification information stored in the buffer 20 (S32). It should be noted that this process is skipped in a case where the other telephone identification information is not stored in the buffer 20. Next, the controller 12 clears the buffer 20 (S34), and proceeds to S100 of FIG. 6. The explanation of the process of S100 and beyond will be omitted here as it has already been described above.

Next, the contents of the process executed in a case where the determination in S10 of FIG. 5 is NO will be explained. The controller 12 monitors to receive an INVITE (S50). In a case where the determination in S50 is NO, the process returns to S10. On the other hand, in a case where the determination in S50 is YES, the controller 12 accordingly executes a call request notice process (S52). Specifically, the controller 12 executes process for outputting a sound from the speaker 32. Consequently, the user of the telephone device 10 comes to know that a call request (a INVITE) has been received (that is, the user is made to recognize that there is an incoming telephone call).

The controller 12 monitors for a call start operation (S54). The user can set the hook key to the off-hook state by picking up the handset 28. In this case, a determination of YES is obtained in S54 and the process proceeds to S60. In S60, the controller 12 sends a 200 OK as the response in reply to the INVITE received in S50. As a result of this, an ACK is sent from the destination of the 200 OK, and an RTP session is thereby established. In a case where S60 ends, the process proceeds to S100.

On the other hand, in a case where the determination in S54 is NO, the controller 12 determines whether or not an INVITE has been received (S56). In a case where the determination in S56 is YES, the controller 12 sends a 486 Busy Here as the response in reply to the INVITE received in S56 (S58). In a case where S58 ends or the determination in S56 is NO, processing returns to S52.

Executing process in accordance with the flowchart of FIGS. 5 and 6 makes it possible to realize telephone communications that are capable of complying efficiently with the above-mentioned first case. That is, in the case of a situation in which, while the user is inputting telephone identification information (SIP-URI) in the off-hook state, an INVITE is received from a telephone device (e.g. the telephone device 60) corresponding to inputting telephone identification information, the call between the telephone devices can be connected in accordance with the INVITE message.

Example of Telephone Communications Using Conventional IP Telephone Devices

Figure 7:
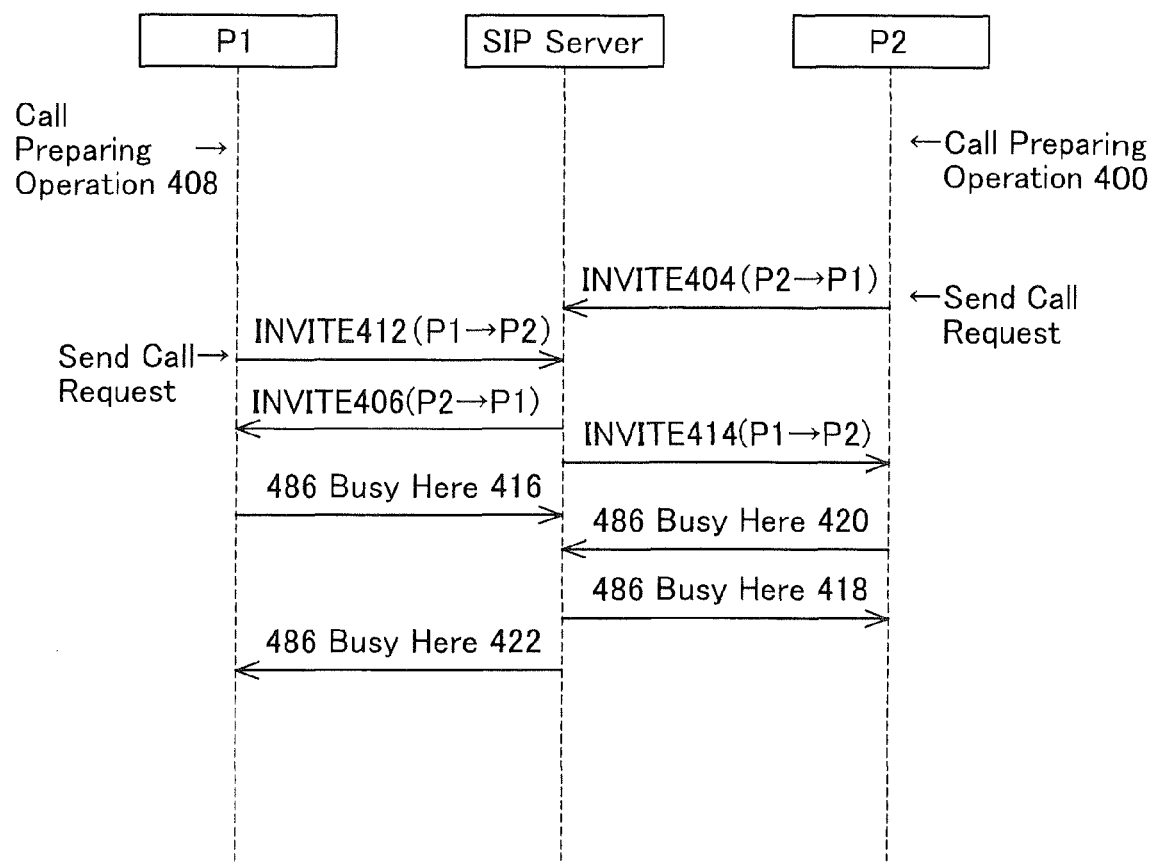
FIG. 7 shows a sequence diagram of an example of telephone communications performed by a conventional telephone device.

Next, another example of telephone communications performed between conventional IP telephone devices will be explained. FIG. 7 shows a sequence diagram of an example of telephone communications performed between the conventional IP telephone devices P1, P2. The user of the telephone device P2 can perform a call preparing operation 400. Accordingly, the telephone device P2 sends an INVITE 404 to the SIP server 52. The SIP server 52, upon receiving the INVITE 404, transfers an INVITE 406 to the telephone device P1. In the example of FIG. 7, the user of the telephone device P1 attempts to place a telephone call to the telephone device P2 by operating a call preparing operation 408 at about the simultaneous timing at which the call preparing operation 400 is being carried out on the telephone device P2 side. The telephone device PI sends an INVITE 412 to the SIP server 52. The SIP server 52, upon receiving the INVITE 412, transfers an INVITE 414 to the telephone device P2.

In the example of FIG. 7, the telephone device P1 receives the INVITE 406 prior to receiving a response in reply to the self-sent INVITE 412. Because the telephone device P1 is in the off-hook state, the telephone device P1 sends a 486 Busy Here 416 to the SIP server 52 as the response in reply to the INVITE 406. The SIP server 52, upon receiving the 486 Busy Here 416, transfers a 486 Busy Here 418 to the telephone device P2. On the other hand, the telephone device P2 receives the INVITE 414 prior to receiving a response in reply to the INVITE 404. Because the telephone device P2 is in the off-hook state, the telephone device P2 sends a 486 Busy Here 420 to the SIP server 52 as the response in reply to the INVITE 414. The SIP server 52, upon receiving the 486 Busy Here 420, the transfers 486 Busy Here 422 to the telephone device P1.

As described hereinabove, the example of FIG. 7 shows a case where the process for sending the INVITE 404 to the telephone device P1 from the telephone device P2 is executed at the same time as the process for sending the INVITE 412 to the telephone device P2 from the telephone device P1. In the conventional telephone devices P1, P2, it is not possible to perform telephone communications in a case like this (hereinafter, called the second case). The telephone device 10 of this embodiment can establish telephone communication even where the above-mentioned second case occurs. The specific procedure for this will be explained by referring to FIG. 8.

Example of Telephone Communications Coping with Second Case

Figure 8:
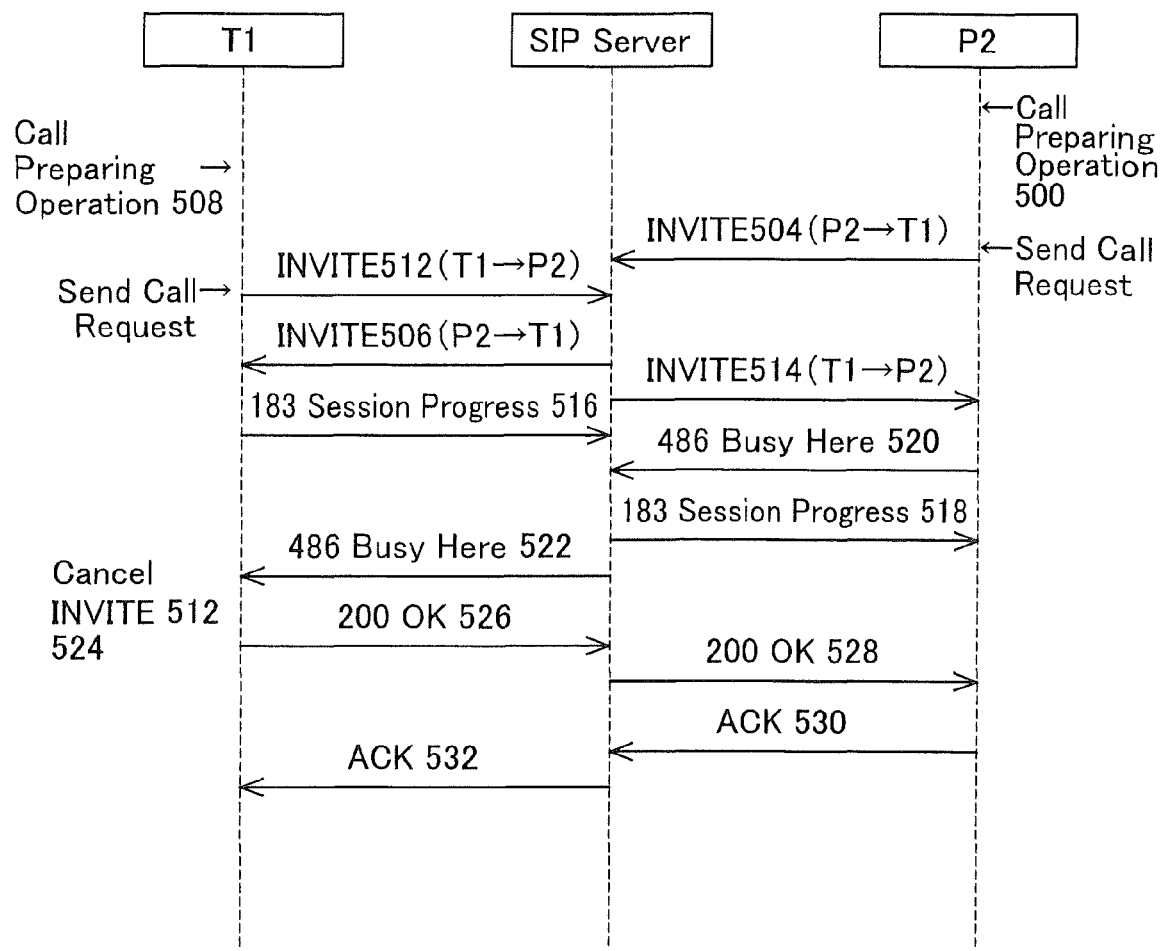
FIG. 8 shows a sequence diagram of an example of telephone communications performed by a telephone device in the embodiment.

FIG. 8 shows a sequence diagram of an example of telephone communications that complies well with the above-mentioned second case. The example of FIG. 8 shows an example of telephone communications performed between the telephone device T1 of this embodiment and the conventional telephone device P2. The user of the telephone device P2 can perform a call preparing operation 500. Accordingly, the telephone device P2 sends an INVITE 504 to the SIP server 52. The SIP server 52, upon receiving the INVITE 504, transfers an INVITE 506 to the telephone device T1. In the example of FIG. 8, the user of the telephone device T1 attempts to place a telephone call to the telephone device P2 by carrying out a call preparing operation 508 at about the simultaneous timing at which the call preparing operation 500 is being carried out on the telephone device P2 side. The telephone device T1 sends an INVITE 512 to the SIP server 52. The SIP server 52, upon receiving the INVITE 512, transfers an INVITE 514 to the telephone device P2.

In the example of FIG. 8, the telephone device T1 receives the INVITE 506 prior to receiving a response in reply to the INVITE 512. The telephone device T1 thus sends a 183 Session Progress 516 to the SIP server 52 as the response in reply to the INVITE 506. The SIP server 52, upon receiving the 183 Session Progress 516, transfers a 183 Session Progress 518 to the telephone device P2. On the other hand, the telephone device P2 receives the INVITE 514 prior to receiving a response in reply to the INVITE 504. Because the telephone device P2 having conventional functions, is in the on-hook state, the telephone device P2 sends a 486 Busy Here 520 to the SIP server 52 as the response in reply to the INVITE 514. The SIP server 52, upon receiving the 486 Busy Here 520, transfers a 486 Busy Here 522 to the telephone device T1.

Upon receiving the 486 Busy Here 522, the telephone device T1 executes a process 524 for cancelling the INVITE 512. Then, the telephone device T1 sends a 200 OK 526 to the SIP server 52 as the response in reply to the INVITE 506. The SIP server 52, upon the receiving 200 OK 526, transfers a 200 OK 528 to telephone device P2. The telephone device P2, upon receiving the 200 OK 528, sends an ACK 530 to the SIP server 52. The SIP server 52, upon receiving the ACK 530, transfers an ACK 532 to the telephone device T1. Consequently, an RTP communication session is established between the telephone device T1 and the telephone device P2. Call established status is constructed between the telephone device T1 and the telephone device P2.

Furthermore, in the example of the above-mentioned FIG. 8, if the telephone device P2 is a telephone device of this embodiment having the functions as those of the telephone device TI rather than having conventional functions, a 183 Session Progress would be sent as the response in reply to the INVITE 514. In this case, the 183 Session Progress is repeatedly sent back and forth between the two telephone devices. The following procedure is employed in this embodiment so as to cancel one of the INVITE to enable telephone communication to be performed in accordance with the other INVITE.

Example of Telephone Communications Complying with the Second Case

Figure 9:
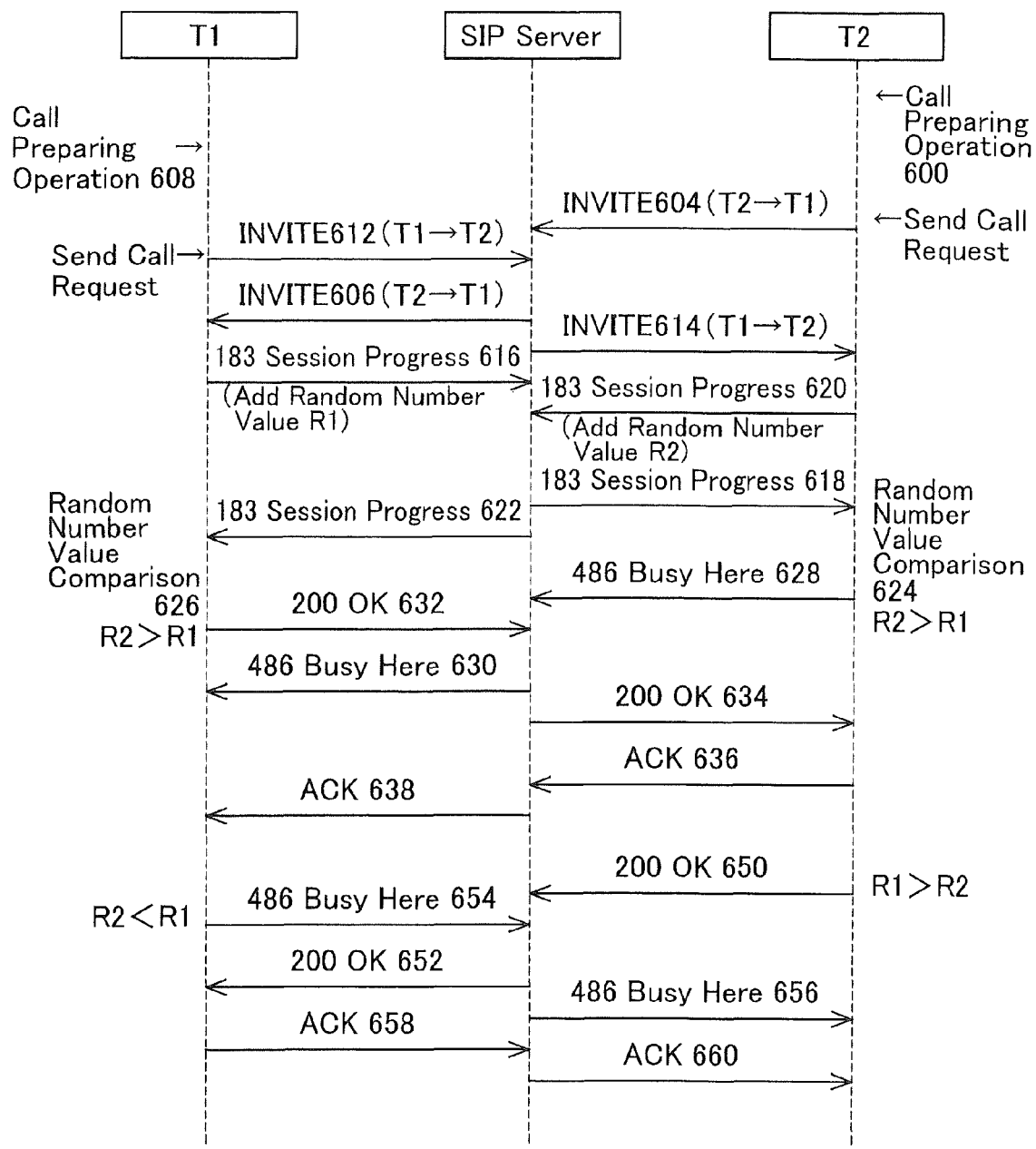
FIG. 9 shows a sequence diagram of an example of telephone communications performed by a telephone device in the embodiment.

FIG. 9 shows a sequence diagram an example of for telephone communications that complies well with the above-mentioned second case. The example of FIG. 9 shows an example of telephone communications performed between the telephone device T1 of this embodiment and the telephone device T2 of this embodiment. The user of the telephone device T2 can perform a call preparing operation 600. Accordingly, the telephone device T2 sends an INVITE 604 to the SIP server 52. The SIP server 52, upon receiving the INVITE 604, transfers an INVITE 606 to the telephone device T1. In the example of FIG. 9, the user of the telephone device T1 attempts to place a telephone call to the telephone device T2 by performing a call preparing operation 608 almost simultaneous to the call preparing operation 600. Accordingly, the telephone device T1 sends an INVITE 612 to the SIP server 52. The SIP server 52, upon receiving the INVITE 612, transfers an INVITE 614 to the telephone device T2.

In the example of FIG. 9, the telephone device Ti receives the INVITE 606 prior to receiving a response in reply to the INVITE 612 (specifically, either a 200 OK or a 486 Busy Here). The telephone device TI thus sends a 183 Session Progress 616 to the SIP server 52 as the response in reply to the INVITE 606. The telephone device T1 generates a random number value R1, and adds the random number value R1 to the 183 Session Progress 616. How the random number value R1 is added to the 183 Session Progress will be explained next.

FIG. 10 shows an example of the 183 Session Progress 616. The 183 Session Progress 616 includes a variety of information 700-712. The information 700 denotes the 183 Session Progress. The information 702 denotes the telephone identification information (SIP-URI) of the source of the 183 Session Progress 616 (that is, the telephone identification information of the telephone device T1). The information 704 shows telephone identification information of the destination of the 183 Session Progress 616 (that is, the telephone identification information of the telephone device T2). The information 706 denotes a session identifier. The information 708 denotes the response in reply to the INVITE. The information 710 includes the random number value R1 generated by the telephone device T1. Specifically in this case, "3f98be3" of the information 710 is the random number value R1. The random number value R1 includes letters of the alphabet, but in a random number comparison process that will be explained below, the random number value R1 is converted to a numerical string. Further, the information 712 is for sending and receiving voice data.

The SIP server 52, upon receiving the 183 Session Progress 616, transfers a 183 Session Progress 618 to the telephone device T2. On the other hand, the telephone device T2 receives the INVITE 614 prior to receiving a response in reply to the INVITE 604. The telephone device T2 sends a 183 Session Progress 620 to the SIP server 52 as the response in reply to the INVITE 614. The telephone device T2 generates a random number value R2, and adds the random number value R2 to the 183 Session Progress 620. The SIP server 52, upon receiving the 183 Session Progress 620, transfers a 183 Session Progress 622 to the telephone device T1.

The telephone device T1, upon the receiving 183 Session Progress 622, specifies random number value R2 included in the 183 Session Progress 622. Next, the telephone device T1 executes a process 626 for comparing the self-generated random number value R1 against the random number value R2. In the one example shown in FIG. 9, the random number value R2 is larger than the random number value R1. In this case, the telephone device T1 sends a 200 OK 632 to the SIP server 52 as the response in reply to the INVITE 606. The SIP server 52, upon receiving the 200 OK 632, transfers a 200 OK 634 to the telephone device T2. The telephone device T2, upon receiving the 200 OK 634, sends an ACK 636 to the SIP server 52. The SIP server 52, upon receiving the ACK 636, transfers an ACK 638 to the telephone device TI. As a result of this, an RTP communication session is established in accordance with the INVITE 606 (corresponding to the INVITE 604) message.

Meanwhile, the telephone device T2, upon receiving the 183 Session Progress 618, specifies the random number value R1 included in the 183 Session Progress 618. Next, the telephone device T2 executes a process 624 for comparing the self-generated random number value R2 against the random number value R1. In the example shown in FIG. 9, the random number value R2 is larger than the random number value R1. In this case, the telephone device T2 sends a 486 Busy Here 628 to the SIP server 52 as the response in reply to the INVITE 614. The SIP server 52, upon receiving the 486 Busy Here 628, transfers a 486 Busy Here 630 to the telephone device T1. As a result of this, the INVITE 614 (INVITE 612) is cancelled.

In the above-described example (the example in which the random number value R2 is larger than the random number value R1), the INVITE 612 that had been sent from the telephone device T1 is cancelled, and the RTP communication session is established in accordance with the INVITE 604 that had been sent from the telephone device T2. The call established status is thereby constructed between the telephone device T1 and the telephone device T2.

In the other example shown in FIG. 9, the random number value R1 is larger than the random number value R2. In this case, the telephone device T1 sends a 486 Busy Here 654 to the SIP server 52 as the response in reply to the INVITE 606. The SIP server 52, upon receiving the 486 Busy Here 654, transfers a 486 Busy Here 656 to the telephone device T2. As a result of this, the INVITE 606 (the INVITE 604) is cancelled. Further, the telephone device T2 sends a 200 OK 650 to the SIP server 52 as the response in reply to the INVITE 614. The SIP server 52, upon receiving the 200 OK 650, transfers a 200 OK 652 to the telephone device T1. The telephone device T1, upon receiving the 200 OK 652, sends an ACK 658 to the SIP server 52. The SIP server 52, upon receiving the ACK 658, transfers an ACK 660 to the telephone device T2. As a result of this, an RTP communication session is established in accordance with the INVITE 612.

In the other example described above (the example in which the random number value R1 is larger than the random number value R2), the INVITE 604 sent from the telephone device T2 is cancelled, and an RTP communication session is established in accordance with the INVITE 612 that had been sent from the telephone device T1. The call established status is thus achieved between the telephone device T1 and the telephone device T2.

Process Executed by Controller

Next, the contents of a process executed by the telephone device 10 for realizing telephone communications (the telephone communications of FIGS. 8 and 9) complying with the above-mentioned second case will be explained. This process is executed the same as the processing of FIG. 5 described hereinabove. In the process that complies with the above-mentioned second case, the processes subsequent to S28 of FIG. 5 (processing of S70 and beyond of FIG. 6) differ from the processes that complies with the above-mentioned first case. Furthermore, the processes subsequent to S60 and the processes subsequent to S34 of FIG. 5 are the same as the process complying with the above-mentioned first case (the same as the processing of S100 through S108 of FIG. 6).

Figure 11:
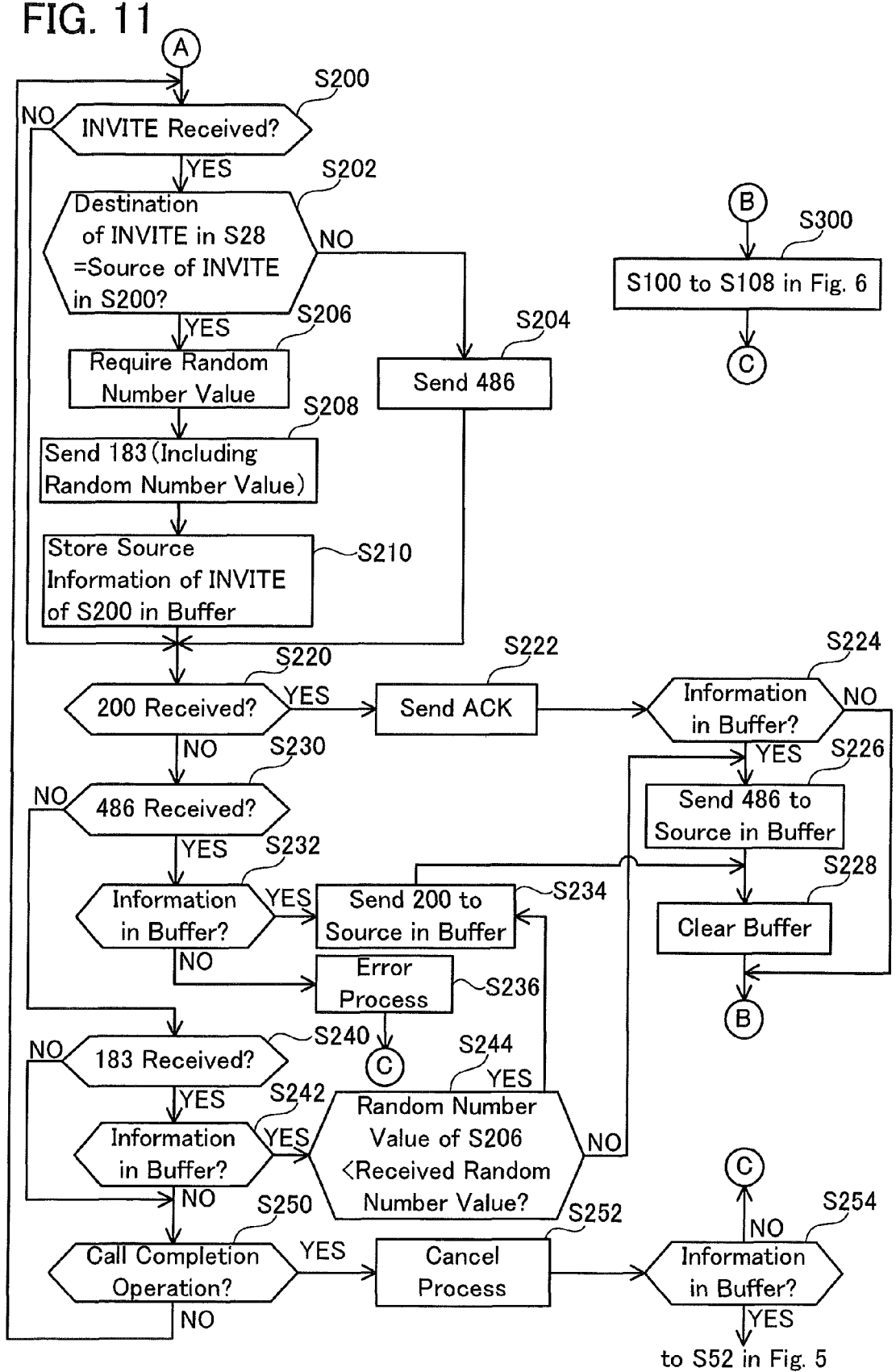
FIG. 11 shows a flowchart of processing executed by the controller.

FIG. 11 shows a flowchart of the processing subsequent to S28 of FIG. 5. The controller 12, upon sending an INVITE in S28 of FIG. 5, monitors to receive an INVITE (S200). In a case where the determination in S200 is YES, the controller 12 determines whether or not the destination of the INVITE sent in S28 is identical to the source of the INVITE received in S200 (S202). In a case where the determination in S202 is NO, the controller 12 sends a 486 Busy Here as the response in reply to the INVITE received in S200 (S204). In a case where S204 ends, the process proceeds to S220.

On the other hand, in a case where the determination in S202 is YES, the controller 12 generates a random number value (S206). The controller 12 generates the random number value by randomly selecting one number from among a plurality of numbers. The random number value generated in the controller 12 is temporarily stored in the storage area 22. Next, the controller 12 sends a 183 Session Progress as the response in reply to the INVITE received in S200 (S208). The random number value generated in S206 is added to this 183 Session Progress. The processing of this S208 is equivalent to the processing of reference numerals 616 or 620 of FIG. 9. Next, the controller 12 stores the telephone identification information of the source of the INVITE received in S200 in the buffer 20 (S210). When S210 ends, the process proceeds to S220.

In S220, the controller 12 monitors to receive a 200 OK as the response in reply to the INVITE sent in S28. In a case where the determination in S220 is YES, the controller 12 sends an ACK to the source of the 200 OK (S222). This ACK is sent to the source of the 200 OK via the SIP server 52. Consequently, a communication session (RTP session) is established between the telephone device 10 and the destination of the INVITE sent in S28. Next, the controller 12 determines whether or not the telephone identification information is stored in the buffer 20 (S224). In a case where the determination in S224 is YES, the controller 12 sends a 486 Busy Here to the source inside the buffer 20 (S226). Next, the controller 12 clears the buffer 20 (S228). In a case where S228 ends or the determination in S224 is NO, the process proceeds to S100 of FIG. 6.

In a case where the determination in S220 is NO, the controller 12 determines whether or not a 486 Busy Here has been received as the response in reply to the INVITE that had been sent in S28 (S230). In a case where the determination in S230 is YES, the controller 12 determines whether or not the telephone identification information is stored in the buffer 20 (S232). In a case where the determination in S232 is NO, the controller 12 executes an error process (S236). This process is the same as that of S76 of FIG. 6. In a case where S236 ends, the process returns to S10 of FIG. 5. Meanwhile, in a case where the determination in S232 is YES, the controller 12 sends a 200 OK to the source inside the buffer 20 (S234). In a case where S234 ends, processing proceeds to S228.

In a case where the determination in S230 is NO, the controller 12 determines whether or not a 183 Session Progress has been received as the response in reply to the INVITE having been sent in S28 (S240). In a case where the determination in S240 is YES, the controller 12 determines whether or not the telephone identification information is stored in the buffer 20 (S242). In a case where the determination in S242 is NO, the process proceeds to S250. On the other hand, in a case where the determination in S242 is YES, the controller 12 compares a random number value generated in S206 against the random number value included in the 183 Session Progress received in S240 (S244). In a case where the latter is larger than the former, the controller 12 proceeds to S234. That is, the controller 12 sends a 200 OK to the source stored in the buffer 20. This process is equivalent to the process of either reference numeral 632 or reference numeral 650 of FIG. 9. On the other hand, in a case where the former is larger than the latter, the controller 12 proceeds to S226. That is, the controller 12 sends a 486 Busy Here to the source stored in the buffer 20. This process is equivalent to the process of either reference numeral 628 or reference numeral 654 of FIG. 9.

In a case where the determination of S240 is NO, the controller 12 determines whether or not a call completion operation has been performed (S250). In a case where the determination in S250 is YES, the controller 12 executes a cancel process (S252). This process is the same as that of S80 of FIG. 6. Next, the controller 12 determines whether or not the telephone identification information is stored in the buffer 20 (S254). In a case where the determination in S254 is NO, the process returns to S10 of FIG. 5. On the other hand, in a case where the determination in S254 is YES, the process proceeds to S52 of FIG. 5. That is, the controller 12 executes a call request notice process. As a result of this, the call request notice process is executed in accordance with the INVITE that had been received in S200.

In a case where the process is executed in accordance with the flowcharts of FIGS. 5 and 11, telephone communications complying with the above-mentioned second case can be realized. That is, in a situation in which, prior to a response to a self-sent INVITE being received, an INVITE is received from a telephone device (for example, the telephone device 60) corresponding to the destination of this self-sent INVITE, the telephone devices can be connected in accordance with either the self-sent INVITE or the received INVITE. Furthermore, executing processing in accordance with the flowcharts in FIGS. 5 and 11 also makes it possible to realize telephone communications complying with the above-mentioned first case.

An overview of a portion of the technical features described hereinbefore will be given here.

There are telephone devices that nullify a call request (i.e. cancel a telephone call) in a case where a response in reply to the call request has not been received during a predetermined time period after the call request has been sent. To support a telephone device like this, the following configuration may be used. That is, the above-described telephone device may further comprise a waiting instruction response sending device configured to send a waiting instruction response in reply to the call request on the condition that the call request is received by the call request receiving device in the time between the call preparing operation being started and this call preparing operation being ended on the operating device. In this case, the first identification information determination device may be configured to determine whether or not the telephone identification information corresponding to the call preparing operation is identical to the telephone identification information of the source of the call request on a condition that the call preparing operation is ended on the operating device. According to this configuration, the waiting instruction response in reply to the above-mentioned call request is sent while the call preparing operation is performed. As a result of this, the source of the call request is able to wait without the call request being nullified.

The above-described telephone device may further comprise a negative response sending device configured to send a negative response in reply to the above-mentioned call request on a condition that a negative determination is obtained by the first identification information determination device. The above-mentioned "negative response" may be a response denoting busy. In this case, the user of the source of the call request can acknowledge that the destinated telephone device is busy. Alternatively, the above-mentioned "negative response" may be a response urging that a voice message be left.

The above-described telephone device may further comprise a call request sending device, a response receiving device, a second identification information determination device and a second positive response sending device. The call request sending device may be configured to send a call request to the telephone identification information corresponding to a call preparing operation as the destination thereof on a condition that the call preparing operation is ended on the operating device. The response receiving device may be configured to receive a response in reply to the call request sent by the call request sending device. The second identification information determination may be configured to determine, on a condition that a second call request is received by the call request receiving device in the time between a first call request being sent by the call request sending device and a response in reply to the first call request being received by the response receiving device (may be called "second predetermined time period" hereinafter), whether or not the telephone identification information of the destination of the first call request is identical to the telephone identification information of a source of the second call request. The above description stating that "the second identification information determination device is configured to determine, on a condition that a second call request is received by the call request receiving device during a second predetermined time period, . . . " does not exclude the above-mentioned determination being made in a case where a second call request is received in a time period other than the above-mention second predetermined time period. The second positive response sending device is configured to send a positive response in reply to the second call request on a condition that a positive determination is obtained by the second identification information determination device.

In the above-described telephone device, in a case where a second call request is received prior to having received a response in reply to a self-sent first call request, the second identification information determination device determines whether or not the telephone identification information of the destination of the first call request is identical to the telephone identification information of the source of the second call request. In a case where the two telephone identification information are identical, a positive response is sent in reply to the second call request. As a result of this, the call established status (that is, a telephone connection) is constructed with the source of the second call request (which also was the destination of the first call request). According to the above-described telephone device, a phone call between telephone devices can be connected in accordance with a received call request even in a case where a call request is received from the destination of a self-sent call request prior to receiving a response in reply to this self-sent call request (may be called the "second case" hereinafter). The call of the telephone devices can be connected in both the first case and the second case.

Furthermore, the positive response sending device may be configured to send a positive response in reply to the second call request, on a condition that a positive determination is obtained by the second identification information determination device, and a negative response is received by the response receiving device in reply to the first call request.

Furthermore, the source of the second call request and the destination of the first call request may be identical, and, in addition, the source of the second call request may be a telephone device that is capable of coping with the second case. In a situation like this, the call established status must be constructed using one of either the first call request or the second call request. The condition for deciding which of these call requests is used must be set beforehand. For this reason, the telephone device may further comprise a waiting instruction response sending device and a condition determination device, which will be described hereinbelow.

The waiting instruction response sending device may be configured to send a waiting instruction response in reply to the second call request on the condition that the second call request is received by the call request receiving device in the time between the first call request being sent by the call request sending device and a response in reply to the first call request being received by the response receiving device. In a case where the source of the second call request has the waiting instruction response sending device, the source of the second call request sends a waiting instruction response in reply to the first call request. That is, the telephone device sends the waiting instruction response in reply to the second call request and receives the waiting instruction response in reply to the first call request.

The condition determination device, on a condition that a waiting instruction response in reply to the first call request is received by the response receiving device, may be configured to determine whether or not a predetermined condition is met, based on information included in the waiting instruction response in reply to the second call request and information included in the waiting instruction response in reply to the first call request. For example, the condition determination device may be configured to determine whether or not the predetermined condition is met by comparing information of a common item (for example, the IP addresses) included in the two waiting instruction responses (for example, comparing numbers, letters, alphanumerics, or data size). Alternatively, for example, the condition determination device may be configured to determine whether or not the predetermined condition is met by comparing the respective total data size of the two waiting instruction responses. Various examples of the above-mentioned predetermined condition are conceivable. The positive response sending device may be configured to send a positive response in reply to the second call request on a condition that the positive determination is obtained by the identification information determination device and also a positive determination is obtained by the condition determination device. That is, in this case, a negative determination is obtained by the condition determination device at the source of the second call request (which was the destination of the first call request), and a positive response is not sent in reply to the first call request. As a result of this, the call established status is constructed using the second call request. According to this configuration, the call established status may be constructed using one of the call requests (while cancelling the other call request) even where both call requests are capable of coping with the second case.

Furthermore, the waiting instruction response sending device may be configured to generate a random number value and to send the waiting instruction response including the generated random number value. In this case, the condition determination device may be configured to determine whether or not the predetermined condition has been met by comparing the random number value included in the waiting instruction response in reply to the second call request against the random number value included in the waiting instruction response in reply to the first call request.

1) The telephone device described above may be configured to perform telephone communications via an IP telephone network. That is, the telephone device described above may be an IP telephone. In this case, the telephone identification information may be an URI-formatted Internet address. On the other hand, in the case where the telephone device is configured to perform telephone communications via a public telephone network, the telephone identification information may be an ordinary telephone number (PSTN telephone number).

2) The telephone device may perform telephone communications using SIP (Session Initiation Protocol).

3) In the case of 2), the call request may be an INVITE command. Further, a positive response may be a 200 OK. Further, a negative response may be 486 Busy Here. Further, the waiting instruction response may be 183 Session Progress.

Examples of variations of the embodiment described hereinabove are given below.

(1) In this embodiment, a random number value R1 is added to information 710, but random number value R1 may also be added to other information (for example, to call ID 706).

(2) In the embodiment described hereinabove, SIP is used. However, other protocols may also be used. For example, "H.323", "MGCP (Media Gateway Control Protocol)", "H.248/MEGACO (Media Gateway Control)" may be used.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A telephone device configured to send a positive response in reply to a call request in order to construct a call established status with a source of the call request, the telephone device comprising:
   a microphone;
   a speaker;
   an operating device configured to allow a user to operate said telephone device;
   a call request sending device configured to send, on a condition that a call preparing operation is ended on the operating device, a call request to telephone identification information corresponding to the call preparing operation as a destination;
   a call request receiving device configured to receive a call request;
   a first identification information determination device configured to determine, on a condition that a second call request is received by the call request receiving device in a time between a call preparing operation being started and the call preparing operation being ended on the operating device and before a first call request being sent by the call request sending device, whether or not telephone identification information corresponding to the call preparing operation is identical to telephone identification information of the source of the second call request; and
   a first positive response sending device configured to send the positive response to the source of the second call request in reply to the second call request on a condition that it is determined by the first identification information determination device that the telephone identification information corresponding to the call preparing operation is identical to the telephone identification information of the source of the second call request.

2. The telephone device as in claim 1, further comprising:
   a waiting instruction response sending device configured to send a waiting instruction response in reply to the second call request on the condition that the second call request is received by the call request receiving device in the time between the call preparing operation being started and the call preparing operation being ended on the operating device,
   wherein the first identification information determination device is configured to determine whether or not the telephone identification information corresponding to the call preparing operation is identical to the telephone identification information of the source of the second call request on a condition that the call preparing operation is ended on the operating device.

3. The telephone device as in claim 1, further comprising:
   a negative response sending device configured to send a negative response in reply to the second call request on a condition that a negative determination is obtained by the first identification information determination device.

4. The telephone device as in claim 1, further comprising:
   a response receiving device configured to receive a response in reply to the call request sent by the call request sending device;
   a second identification information determination device configured to determine, on a condition that a fourth call request is received by the call request receiving device in the time between a third call request being sent by the call request sending device and a response in reply to the third call request being received by the response receiving device, whether or not telephone identification information of the destination of the third call request is identical to telephone identification information of a source of the fourth call request; and
   a second positive response sending device configured to send a positive response in reply to the fourth call request on a condition that a positive determination is obtained by the second identification information determination device.

5. A telephone device configured to send a positive response in reply to a call request in order to construct a call established status with a source of the call request, the telephone device comprising:
   a microphone;
   a speaker;
   an operating device configured to allow a user to operate said telephone device;
   a call request sending device configured to send, on a condition that a call preparing operation is ended on the operating device, a call request to telephone identification information corresponding to the call preparing operation as a destination;
   a response receiving device configured to receive a response in reply to the call request sent by the call request sending device;
   a call request receiving device configured to receive a call request;
   an identification information determination device configured to determine, on a condition that a second call request is received by the call request receiving device in the time between a first call request being sent by the call request sending device and a response in reply to the first call request being received by the response receiving device, whether or not telephone identification information of the destination of the first call request is identical to telephone identification information of the source of the second call request;
   a positive response sending device configured to send a positive response to the source of the second call request in reply to the second call request on a condition that it is determined by the identification information determination device that the telephone identification information corresponding to the call preparing operation is identical to the telephone identification information of the source of the second call request;
   a waiting instruction response sending device configured to send a waiting instruction response in reply to the second call request on the condition that the second call request is received by the call request receiving device in the time between the first call request being sent by the call request sending device and the response in reply to the first call request being received by the response receiving device; and a condition determination device configured to determine, on a condition that a waiting instruction response in reply to the first call request is received by the response receiving device, whether or not a predetermined condition is met, based on information included in the waiting instruction response in reply to the second call request and information included in the waiting instruction response in reply to the first call request,
   wherein the positive response sending device is configured to send the positive response in reply to the second call request on a condition that it is determined by the identification information determination device that the telephone identification information of the destination of the first call request is identical to telephone identification information of the source of the second call request and it is determined by the condition determination device that the predetermined condition is met.

6. The telephone device as in claim 5, wherein
the positive response sending device is configured to send the positive response in reply to the second call request on the condition that a positive determination is obtained by the identification information determination device and a negative response in reply to the first call request having been received by the response receiving device.

7. The telephone device as in claim 5, wherein
the waiting instruction response sending device is configured to generate a random number value and to send the waiting instruction response which includes the generated random number value, and
the condition determination device is configured to determine whether or not a predetermined condition is met by comparing a random number value included in a waiting instruction response in reply to the second call request to a random number value included in a waiting instruction response in reply to the first call request.

* * * * *